US012657284B2

(12) United States Patent
Griffin et al.

(10) Patent No.: US 12,657,284 B2
(45) Date of Patent: Jun. 16, 2026

(54) CODE COVERAGE BASED RISK MITIGATION FOR CONTAINERS

(71) Applicant: Red Hat, Inc., Raleigh, NC (US)

(72) Inventors: Leigh Griffin, Waterford (IE); Pierre-Yves Chibon, Puteaux (FR)

(73) Assignee: Red Hat, LLC, Raleigh, NC (US)

( * ) Notice: Subject to any disclaimer, the term of this patent is extended or adjusted under 35 U.S.C. 154(b) by 218 days.

(21) Appl. No.: 18/079,409

(22) Filed: Dec. 12, 2022

(65) Prior Publication Data

US 2024/0193259 A1    Jun. 13, 2024

(51) Int. Cl.
G06F 21/00    (2013.01)
G06F 8/73    (2018.01)
G06F 21/53    (2013.01)

(52) U.S. Cl.
CPC .............. G06F 21/53 (2013.01); G06F 8/73 (2013.01); *G06F 2221/033* (2013.01)

(58) Field of Classification Search
CPC ...... G06F 21/53; G06F 2221/033; G06F 8/73; G06F 21/51; G06F 21/577
See application file for complete search history.

(56) References Cited

U.S. PATENT DOCUMENTS 9,715,441 B2    7/2017  Rajamanickam et al.
10,769,009 B2   9/2020  Luo et al.
11,113,185 B2   9/2021  Sandhu et al.

11,151,024 B2   10/2021  Hwang et al.
11,550,903 B1 *  1/2023  Epstein ................... G06F 21/57
2009/0144698 A1 * 6/2009  Fanning .............. G06F 11/3676
                                                              717/120
2018/0054449 A1 * 2/2018  Nandha Premnath ......................
                                                              G06F 21/566
2020/0159933 A1 * 5/2020  Ciano ................... G06F 21/577
2023/0004652 A1 * 1/2023  Gupta ................... G06F 21/563
2023/0252157 A1 * 8/2023  Pieczul ................ G06F 21/554
                                                              726/25

FOREIGN PATENT DOCUMENTS

CN       110413513  A    11/2019

OTHER PUBLICATIONS

Google, "Syft & Grype", 2025, Google search, p. 1 (Year: 2025).*

(Continued)

*Primary Examiner* — Joseph P Hirl
*Assistant Examiner* — Chi D Nguy
(74) *Attorney, Agent, or Firm* — Dority & Manning, P.A.

(57)    ABSTRACT

For each layer of a plurality of layers of a containerized unit of software instructions, a service loaded by the layer is determined. Service state information associated with the service loaded by the layer is retrieved, wherein the service state information comprises at least one of source software instructions that implement the service or code repository metadata for a code repository that stores the source software instructions. Code coverage information indicative of a degree of code coverage for the source software instructions that implement the service is obtained. Based at least in part on the code coverage information and the service state information, the layer is annotated with risk information indicative of a degree of risk associated with the layer.

19 Claims, 4 Drawing Sheets

(56)     References Cited

OTHER PUBLICATIONS

Javed, Omar, et al., "Understanding the Quality of Container Security Vulnerability Detection Tools," arXiv:2101.03844v1 [cs. CR], Jan. 11, 2021, 11 pages.

Rastogi, Vaibhav, et al., "New Directions for Container Debloating," Association for Computing Machinery, FEAST 17, https://doi.org/10.1145/10.1145/3141235.3141241, Nov. 3, 2017, 6 pages.

Xu, Tianyin, et al., "Mining Container Image Repositories for Software Configuration and Beyond," 2018 ACM/IEEE 40th International Conference on Software Engineering: New Ideas and Emerging Results, ICSE-NIER'18, https://doi.org/10.1145/3183399.3183403, May 2018, 4 pages.

* cited by examiner

CODE COVERAGE BASED RISK MITIGATION FOR CONTAINERS

BACKGROUND

The use of containerized units of software instructions, or "containers", is a popular method for achieving process isolation. Containers, at a high level, are units of software instructions that have been containerized for process isolation. To do so, containers include units of software that contain all components necessary for an application to run in any computing environment (e.g., the application, dependencies, configuration files, libraries, relevant binaries, etc.).

Many containers are constructed using a variety of layers. A layer may be responsible for loading one or more services. For example, one layer of a container may load read/write services, while a second layer handles mouse/keyboard input functionality, and a third layer handles database implementation. Some containerization techniques provide the capability to swap certain layers for other layers that fulfill the same purpose. To follow the previous example, if the third layer handling database implementation loaded a first type of database service, and another layer not included in the container loaded a more preferable type of database service, the third layer could be replaced with the other layer to optimize the container.

SUMMARY

The examples implement mechanisms for enabling code coverage based risk mitigation for containers. For layers of a containerized unit of software instructions, services loaded by the layers are identified. Service state information associated with the services is retrieved (e.g., source software instructions, code repository metadata, etc.). Code coverage information is retrieved that indicates degrees of code coverage for sets of source software instructions that respectively implement the services. Based at least in part on the code coverage information, each of the layers are annotated with risk information indicative of a degree of risk associated with the respective layers.

In one example, a method is provided. The method includes, for each layer of a plurality of layers of a containerized unit of software instructions, identifying, by a computing system comprising one or more computing devices, a service loaded by the layer. The method includes, for each layer of the plurality of layers of the containerized unit of software instructions, retrieving service state information associated with the service loaded by the layer, wherein the service state information comprises at least one of source software instructions that implement the service, or code repository metadata for a code repository that stores the source software instructions. The method includes, for each layer of the plurality of layers of the containerized unit of software instructions, obtaining code coverage information indicative of a degree of code coverage for the source software instructions that implement the service. The method includes, for each layer of the plurality of layers of the containerized unit of software instructions, based at least in part on the code coverage information and the service state information, annotating the layer with risk information indicative of a degree of risk associated with the layer.

In another example, a computing system is provided. The computing system includes one or more computing devices to, for each layer of a plurality of layers of a containerized unit of software instructions, identify a service loaded by the layer. The one or more computing devices are further to, for each layer of the plurality of layers of the containerized unit of software instructions, retrieve service state information associated with the service loaded by the layer, wherein the service state information comprises at least one of source software instructions that implement the service, or code repository metadata for a code repository that stores the source software instructions. The one or more computing devices are further to, for each layer of the plurality of layers of the containerized unit of software instructions. The one or more computing devices are further to, for each layer of the plurality of layers of the containerized unit of software instructions, obtain code coverage information indicative of a degree of code coverage for the source software instructions that implement the service. The one or more computing devices are further to, for each layer of the plurality of layers of the containerized unit of software instructions, based at least in part on the code coverage information and the service state information, annotate the layer with risk information indicative of a degree of risk associated with the layer.

In another example, a non-transitory computer-readable storage medium is provided. The non-transitory computer-readable storage medium includes executable instructions to cause one or more processor devices to, for each layer of a plurality of layers of a containerized unit of software instructions, identify a service loaded by the layer. The executable instructions are further to cause the one or more processor devices to, for each layer of the plurality of layers of the containerized unit of software instructions, retrieve service state information associated with the service loaded by the layer, wherein the service state information comprises at least one of source software instructions that implement the service, or code repository metadata for a code repository that stores the source software instructions. The executable instructions are further to cause the one or more processor devices to, for each layer of the plurality of layers of the containerized unit of software instructions, obtain code coverage information indicative of a degree of code coverage for the source software instructions that implement the service. The executable instructions are further to cause the one or more processor devices to, for each layer of the plurality of layers of the containerized unit of software instructions, based at least in part on the code coverage information, determine risk information indicative of a degree of risk associated with the layer.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
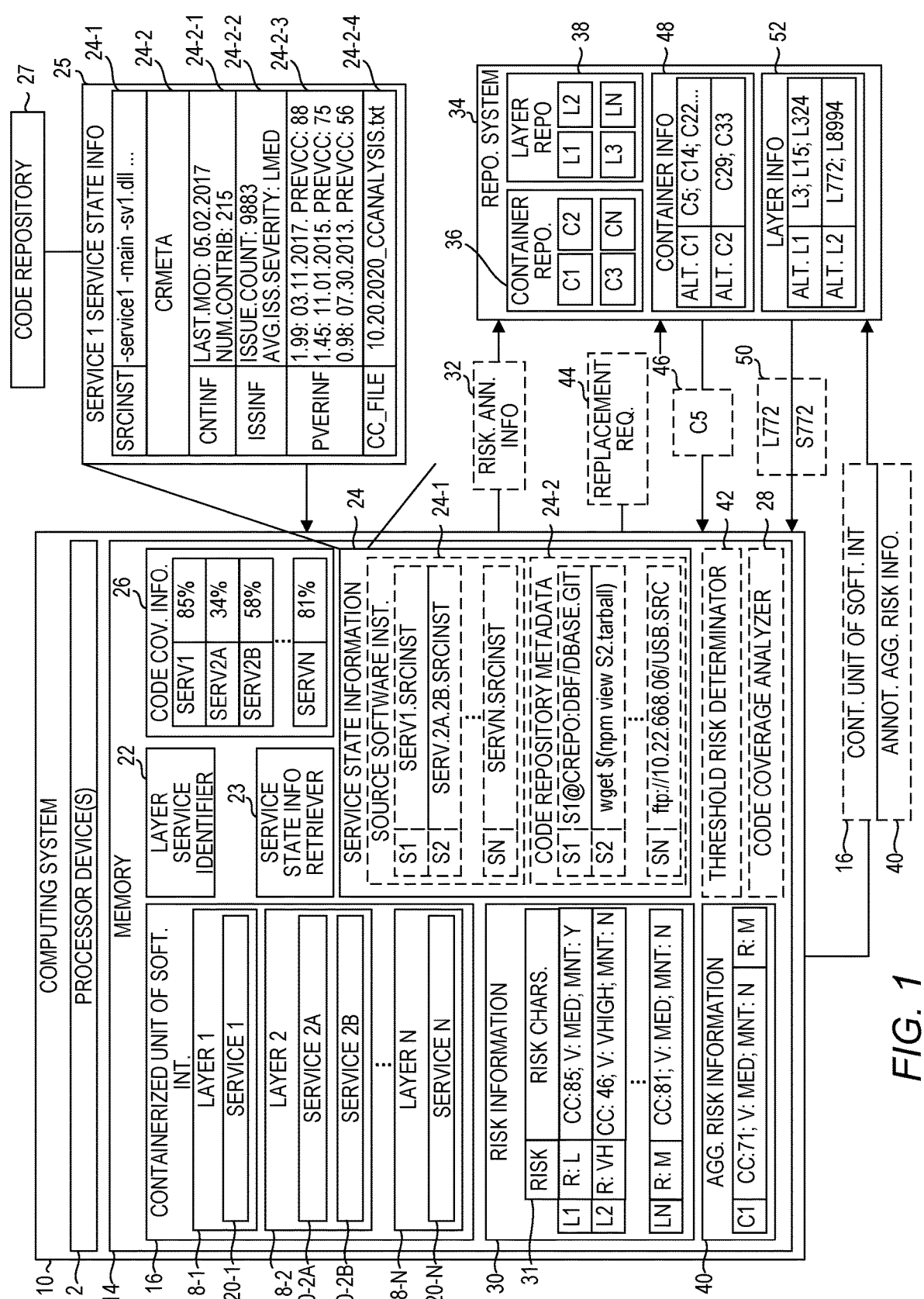
FIG. 1 is a block diagram of an environment suitable for implementing code coverage based risk mitigation for containers.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Many conventional containerization techniques generate containers using a layer-wise structure, with certain layers being responsible for loading certain services. For example, a first layer of a container may load read/write services, while a second layer of a container may load Structured Query Language (SQL) database services. In many instances, a layer of a container can be replaced with a different container layer that fulfills the same purpose. For example, a layer of a container may be responsible for loading input/output services for peripheral devices such as mice and keyboards. However, it may be determined that the container is to be executed on a device with a touchscreen input device that is not compatible with the current input/output layer. In response, a container layer that is designed to load touchscreen input/output handling services can be retrieved (e.g., from a container layer repository) and can be used to replace the current input/output layer. In such fashion, the layers of a containerized unit of software instructions can be replaced with similar layers to optimize the performance of the containerized unit of software instructions.

Code coverage analysis is commonly used in the field of software engineering to determine a degree of coverage provided by test suites. More specifically, software engineers will conventionally write a test suite to comprehensively test the functionality of a unit of software instructions. After a test suite is written for a unit of software instructions (e.g., containerized instructions, etc.), a code coverage analysis may be performed to determine what proportion of the unit of software instructions (i.e., "code") is actually tested (i.e., "covered") by the test suite. For example, if a unit of software instructions included ten (10) functions, and a corresponding test suite tested the functionality of eight (8) of those functions, a code coverage analysis may indicate that the unit of software instructions has 80% code coverage.

Units of software instructions that lack comprehensive code coverage (e.g., have no corresponding test suite, only have 30% code coverage, etc.) almost invariably possess bugs, security vulnerabilities, and/or other issues of concern. As such, many software engineers consider the degree of code coverage offered by a test suite to serve as an accurate heuristic for the overall risk posed by a corresponding unit of software instructions. For example, a unit of software instructions with a low degree of code coverage (e.g., 20% code coverage) is relatively likely to include at least one security vulnerability or bug, and therefore poses a high risk. Conversely, while it is technically possible for a unit of software instructions with a high degree of code coverage (e.g., 95% code coverage) to possess security vulnerabilities, it is much less likely to, and therefore poses a much lower risk.

Containerization has become an increasingly popular method of process isolation among computing service providers, such as cloud computing service providers. A key factor in the popularity of containerization is the ease with which a container can be constructed using pre-existing layers. For example, a requestor may request a container from a service provider for a particular purpose. In response, the service provider may retrieve an existing container, or create a new container using pre-existing layers (e.g., from a container layer repository), and provide the container to the requestor.

As the layers of containers usually load large numbers of services, which in many instances originate from different providers, it is important for container users to determine the risk that each service of a container poses. For example, if a container is created for a security-specific purpose (e.g., user authentication), it is critical to ensure that services loaded by layers of the container do not carry substantial risks of security vulnerabilities. However, once a container has been packaged, the source code of the layers of the container that load services is no longer directly accessible. Without direct access to the source code of the layers, code coverage analysis cannot be performed, therefore eliminating a key aspect of container risk mitigation.

Accordingly, aspects of the present disclosure propose code coverage based risk mitigation for containers. More specifically, implementations of the present disclosure can identify a service loaded by each layer of a containerized unit of software instructions (e.g., a packaged container). For example, it may be determined that a first layer of the containerized unit of software instructions loads an input/output handler service. Service state information that is associated with the service can be retrieved. The service state information can include source software instructions that implement the service (e.g., source code that implements the input/output handler service, etc.). Additionally, or alternatively, the service state information can include code repository metadata for a code repository that stores the source software instructions.

As an example, metadata for the containerized unit of software instructions, such as a spec file, may include information that indicates a location of a code repository for the input/output handler service loaded by the layer (e.g., a URL, a package identifier for a package manager, etc.). The code repository can be accessed to retrieve the source code included in the layer that implements the input/output handler service. Additionally, code repository metadata can be retrieved from the code repository data, which can indicate various characteristics of the code repository (e.g., a last time the source code was updated, a number of maintainers for the source code, a previously performed code coverage analysis (if available), etc.).

Code coverage information can be obtained that indicates a degree of code coverage for the source software instructions (e.g., 50% code coverage, 75% code coverage, 'very high' code coverage, 'low medium' code coverage, etc.). For example, the code coverage information may be generated by performing a code coverage analysis on the source software instructions that implement the service. For another example, the code coverage information may be extracted from a previously generated code coverage file included in the code coverage information.

Based on the code coverage information and the service state information, the layer can be annotated with risk information that indicates a degree of risk associated with the layer. For example, the risk information may indicate a degree of code coverage. Additionally, in some implementations, the risk information may indicate additional characteristics of the layer and/or the service loaded by the layer (e.g., relevant information from the code repository metadata such as an update frequency for the service, a number of contributors to the service, a quantity of identified bugs in the source software instructions that implement the service, etc.).

By annotating risk information to each layer of the container, it can be determined whether inclusion of a layer poses too great of a risk. In such fashion, layers with a degree of risk greater than a threshold can be identified and replaced with alternate layers that fulfill the same purpose, therefore providing code coverage based risk mitigation for containerized units of software instructions.

Aspects of the present disclosure provide a number of technical effects and benefits. As one example technical effect and benefit, conventional risk mitigation techniques cannot be applied to a containerized unit of software instructions due to a lack of direct access to source code used to implement the layers of the containerized unit of software instructions. In turn, this leads to the unintentional inclusion of security vulnerabilities, bugs, and other issues that substantially decrease the efficiency of the containerized unit of software instructions (e.g., causing increased expenditure of computing resources). However, implementations of the present disclosure can obtain code coverage information for each service loaded by layers of a container, therefore eliminating the increased expenditure of computing resources (e.g., power, memory, compute cycles, storage, bandwidth, etc.) caused by the reduction in performance associated with bugs, security vulnerabilities, etc.

FIG. 1 is a block diagram of an environment suitable for implementing code coverage based risk mitigation for containers. A computing system 10 includes processor device(s) 12 and memory 14. In some implementations, the computing system 10 may be a computing system that includes multiple computing devices. Alternatively, in some implementations, the computing system 10 may be one or more computing devices within a computing system that includes multiple computing devices. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 14 can include a containerized unit of software instructions 16 (i.e., a "packaged container"). The containerized unit of software instructions 16 can collectively form a container that has been packaged using any type or manner of containerization technique.

The containerized unit of software instructions 16 can include one or more applications, and can further implement any software or hardware necessary for execution of the containerized unit of software instructions 16 within any type or manner of computing environment. For example, the containerized unit of software instructions 16 can include software instructions that contain or otherwise implement all components necessary for process isolation in any environment (e.g., the application, dependencies, configuration files, libraries, relevant binaries, etc.).

Many, if not all, of the services required to execute an application can be loaded by layers 18 of the containerized unit of software instructions 16. In particular, the containerized unit of software instructions 16 can include a plurality of layers 18-1-18-N (generally, layers 18). The layers 18 can load a respective plurality of services 20-1-20-N (generally, services 20). For example, layer 18-1 can load service 20-1 (e.g., an input/output handler service), layer 18-N can load service 20-2 (e.g., a read/write service), etc.

It should be noted that, in some implementations, one of the layers 18 may load more than one of the services 20. For example, as depicted, layer 18-2 may be a layer responsible for handling all input/output operations for peripheral devices. To do so, layer 18-2 may load a first service 20-2A which handles input/output operations for peripheral input/output devices (e.g., mice, keyboards, touchscreens, microphones, speakers, etc.), and a second service 20-2B which handles input/output operations for specialized peripheral devices (e.g., printers, fax machines, scanners, etc.). Alternatively, in some implementations, each of the layers 18 of the containerized unit of software instructions 16 may load a single corresponding service of the services 20.

For each layer of the layers 18 of the containerized unit of software instructions 16, the computing system 10 can identify the services 20 loaded by the layers 18. For example, the computing system 10 may utilize layer service identifier 22 to identify that layer 18-1 loads service 20-1, layer 18-2 loads services 20-2 and 20-2B, etc. For each layer of the layers 18, the computing system can retrieve service state information 24 associated with the service loaded by the respective layer. For example, the computing system 10 may retrieve the service state information 24 using the service state information retriever 23. For each of the layers 18, the corresponding service state information 24 for the layer can include at least one of source software instructions 24-1 or code repository metadata 24-2.

Specifically, in some implementations, the service state information 24 can include source software instructions 24-1. The source software instructions 24-1 can be software instructions that implement the service loaded by the layer. For example, layer 18-1 can include a large number of software instructions for implementing service 20-1 and various other software and/or virtualized hardware components (e.g., libraries, packages, binaries, configuration files, etc.). The subset of these software instructions that implements the service 20-1 can be source software instructions 24-1.

Additionally, or alternatively, in some implementations, the service state information 24 can include code repository metadata 24-2 for a code repository 27 that stores the source software instructions 24-1. To follow the previous example, the source software instructions 24-1 that implement the service 20-1 loaded by the layer 18-1 can be stored in code repository 27. The code repository 27 may include, or otherwise implement, a code versioning system, and the code repository metadata 24-2 can be information regarding a current and/or previous state of the source software instructions 24-1 stored in the code repository 27.

It should be noted that, in some implementations, the code repository metadata 24-2 may be retrieved from a source other than a code repository 27. For example, as depicted, the services implemented by layer 18-2 can be services that are maintained as packages using a package manager (e.g., node package manager). The source software instructions 24-1 and code repository metadata 24-2 for service 20-2 (e.g., 20-2A/20-2B) can be retrieved by providing a command (e.g., wget $(npm view S2.tarball), etc.) to the package manager. For another example, the code repository metadata 24-2 may be retrieved from a File Transfer Protocol (FTP) server, a local storage device, a remote storage device, etc.

In some implementations, the code repository metadata 24-2 may include contributor information 24-2-1 that describes contributors to the source software instructions 24-1 (e.g., a number of contributors, a number of contributions made by each contributor, an employee role assigned to each contributor, an error rate associated with the contributions of each contributor, a rate at which contributions from a contributor are rejected etc.). For example, the code repository metadata 24-2 may include contributor information 24-2-1 indicating that a contributor who has made previous contributions with a 60% error rate has recently made a large number of contributions to the source software instructions 24-1 which have not yet been verified for errors.

Additionally, or alternatively, in some implementations, the code repository metadata 24-2 may include issue information 24-2-2 that indicates a degree of severity assigned to issues within the source software instructions 24-1. For example, contributors to the code repository 27 may flag errors within the source software instructions with a predicted degree of severity (e.g., "memory leak associated with this function. Severity: Very High"). The code repository metadata 24-2 can include issue information 24-2-2 that indicates identified issues and an associated degree of severity that has been assigned to the identified issues.

Additionally, or alternatively, in some implementations, the code repository metadata 24-2 can include prior version information 24-2-3 that describes prior modifications to the source software instructions 24-1 submitted to the code repository 27. For example, a contributor can submit a request (e.g., a "pull" request) to the code repository 27 (e.g., a code versioning system implemented by the code repository 27, etc.) requesting that modifications to the source software instructions 24-1 be accepted. Once accepted, the code repository 27 may assign a new version indication to the source software instructions 24-1 (e.g., going from version 1.0.03 to 1.0.1, etc.). The prior version information 24-2-3 of the code repository metadata 24-2 can indicate the number of versions, the date on which new versions were published, and the differences between the different versions of the service source software instructions 24-1.

Additionally, or alternatively, in some implementations, the code repository metadata 24-2 may include a code coverage file 24-2-4 that indicates a degree of code coverage for the source software instructions. For example, an entity (e.g., the code repository 27, the code versioning system, a contributor to the code repository 27, etc.) may have previously generated a code coverage file 24-2-4 for the source software instructions 24-1 that indicates a degree of code coverage for the source software instructions 24-1 at the time the code coverage file was generated. The code coverage file 24-2-4 can indicate a date on which the code coverage file 24-2-4 was generated, and a degree of code coverage for the source software instructions on the indicated date.

In some implementations, the service state information 24 may include retrieval information indicating a location from which source software instructions 24-1 and/or code repository metadata 24-2 can be retrieved (e.g., a Uniform Resource Locator (URL), an FTP address, a file location for a local file, a command to a service implementing entity (e.g., a package manager, a code repository, etc.). For example, retrieval information is depicted within code repository metadata 24-2, and indicates that the source software instructions 24-1 and the code repository metadata 24-2 for service 20-1 can be retrieved from code repository 27 (e.g., S1@CREPO:DBF/DBASE.GIT).

Service state information 25 is service state information for service 20-1, and is provided as an illustrative example of service state information 24. For example, the service state information 25 can include software instructions 24-1 for service 20-1. The software instructions 24-1 for service 20-1 can be any type or manner of software instructions (e.g., binary code, assembly code, code written in one or more programming languages, etc.), and can be organized in any type or manner of format. For example, the software instructions 24-1 may include a large number of files written in a variety of programming languages, and may be organized according to a file structure. For another example, the source software instructions 24-1 may be a single file of software instructions written in one programming language. For yet another example, the source software instructions 25-2 may be software instructions that have been compiled or interpreted to form an intermediate representation.

For another example, as depicted, the service state information 25 can include code repository metadata 24-2 from the code repository 27 that stores the source software instructions 24-1 that implement the service 20-1. The code repository metadata 24-2 can include contribution information 24-2-1, issue information 24-2-2, previous version information 24-2-3, and a code coverage file 24-2-4 for the service 20-1.

More specifically, as depicted, the contribution information 24-2-1 of the code repository metadata 24-2 can describe a date on which the source software instructions 24-1 were last modified (e.g., May 2, 2017), a number of contributors to the code repository 27 (e.g., code versioning system, etc.) that stored the source software instructions 24-1 that implement the service 20-1 (e.g., NUM.CONTRIB: 215 contributors), etc. The issue information 24-2-2 of the code repository metadata 24-2 can indicate a number of issues with the source software instructions 24-1 identified by the contributors (e.g., ISSUE.COUNT: 9883), a description of at least some of the issues (not depicted), and an average severity of the issues identified for source software instructions 24-1 (e.g., AVG.ISS.SEVERITY: LMED (i.e., low-medium)), etc.

For another example, as depicted, the previous version information 24-2-3 of the code repository metadata 24-2 can include, or otherwise describe, previous versions of the source software instructions 24-1. For example, the previous version information 24-2-3 indicates that a previous version 1.99 of the source software instructions 24-1 was established Mar. 11, 2017, a preceding version 1.45 was established Nov. 1, 2015, and that another preceding version 0.98 was established Jul. 30, 2013. Additionally, in some implementations, the previous version information 24-2-3 can indicate differences between the previous versions of the source software instructions 24-1 (not depicted). For example, the private version information 24-2-3 may include a summarization of differences between versions 1.45 and 1.99 of the source software instructions 24-1 for the service 20-1.

Additionally, or alternatively, in some implementations, the previous version information 24-2-3 can indicate previous code coverage information for the corresponding previous versions of the source software instructions 24-1. For example, the previous version information 24-2-3 may indicate that the previous degree of code coverage is 88% for version 1.99, 75% for version 1.45, and 56% for version 0.98.

For another example, as depicted, the code coverage file 24-2-4 of the code repository metadata 24-2 for the service 20-1 can indicate a degree of code coverage for the source software instructions 24-1 that implement the service 20-1. For example, the code repository 27 from which the code repository metadata 24-2 is retrieved may be, or otherwise implement, a code versioning system. The code versioning system may routinely perform code coverage analysis for the source software instructions 24-1, and may store the results of the code coverage analysis as code coverage file 24-2-4. The code coverage file 24-2-4 can be included in the code repository metadata 24-2 and can be retrieved from the code repository 27 alongside code repository metadata 24-2. In such fashion, the computing system 10 can obtain code coverage information 26 without performing code coverage analysis for the source software instructions 24-1.

The computing system 10 can obtain code coverage information 26 for the source software instructions that implement each of the services 20. For example, as depicted, the code coverage information 26 can describe a degree of code coverage for the source software instructions that implement service 1 (e.g., 85%), service 2A (e.g., 34%), service 2B (e.g., 58%), and service N (e.g., 81%). It should be noted that, in some implementations, if two services (e.g., services 20-2A and 20-2B) are implemented by the same source software instructions 24-1, the code coverage information 26 may indicate a single degree of code coverage information for both services.

In some implementations, the computing system 10 can obtain the code coverage information 26 by performing a code coverage analysis on the source software instructions 24-1 that implement the service 20. For example, to obtain the source software instructions 24-1 for the service 20-1, the computing system may utilize code coverage analyzer 28 to perform any type or manner of code coverage analysis to obtain the code coverage information 26.

Additionally, or alternatively, in some implementations, if the code repository metadata 24-2 includes the code coverage file 24-2-4, the computing system 10 can extract the code coverage information 26 from the code coverage file 24-2-4. For example, the computing system 10 can retrieve the service state information 25 for service 20-1. The service state information 25 can include the code repository metadata 24-2 and the code coverage file 24-2-4. The computing system 10 can determine, rather than perform a code coverage analysis using the code coverage analyzer 28, to instead extract the code coverage information 26 from the code coverage file 24-2-4.

In some implementations, after extracting the code coverage information 26 from the code coverage file 24-2-4, the computing system 10 can determine that the code coverage information 26 extracted from the code coverage file 24-2-4 is insufficient. For example, the computing system 10 may determine that the code coverage file 24-2-4 was obtained using an insufficiently accurate code coverage analysis technique. In this case, the computing system 10 can obtain new code coverage information 26 by performing code coverage analysis of the source software instructions 24-1 using the code coverage analyzer 28.

The computing system 10 can, based at least in part on the code coverage information 26, determine risk information 30 for each of the layers 18 that indicates a degree of risk 31 associated with the layer. In particular, the risk information 30 can indicate a degree of code coverage for the service loaded by the respective layer 18. Additionally, or alternatively, in some implementations, the risk information 30 may describe additional risk characteristics, and/or an overall degree of risk 31 associated with the layer 18.

For example, as depicted, the risk information 30-1 determined for layer 18-1 indicates a degree of code coverage for the service 20-1 loaded by layer 18-1 (e.g., 85), a risk posed by security vulnerabilities associated with the source software instructions 24-1 that implement service 20-1 (e.g., vulnerability risk: medium), whether or not the source software instructions 24-1 have been maintained recently (e.g., YES), and an overall degree of risk 31 posed by the layer 18-1 (e.g., RISK: low).

In some implementations, the overall degree of risk 31 for a layer 18 indicated by the risk information 30 can be determined based on a weighted analysis of other risk factors indicated by the risk information 30.

For example, for layer 18-2, the risk information indicates that the code coverage is 46%, the risk of security vulnerabilities is "very high", that it has not been recently maintained, and that the overall risk is "very high". The computing system 10 may determine that the overall risk posed by the layer 18-2 is "very high" if the code coverage is under a certain threshold (e.g., 60%, 50%, etc.). Alternatively, the computing system 10 may determine that the overall degree of risk 31 is very high for layer 18-2 of the security vulnerability risk for layer 18-2 is above "medium" and the layer 18-2 has not been recently maintained. As such, it should be broadly understood that the overall degree of risk 31 determined by the computing system 10 can be based on any variety and weighting of risk factors.

In some implementations, the computing system 10 can annotate each of the layers 18 with corresponding risk information 30. For example, metadata of the containerized unit of software instructions 16 can be modified to indicate the risk information 30 for each of the layers 18. In some implementations, the risk information 30 can be provided as annotated risk information 32. For example, the annotated risk information 32 can be provided to a repository system 34 that serves as a container repository 36 (e.g., a repository that stores multiple containers) and/or container layer repository 38 (e.g., a repository that stores multiple container layers). For another example, the computing system 10 can provide the layers 18 annotated with the risk information 30 to the repository system 34.

It should be noted that, in some implementations, the repository system 34 can be implemented by the computing system 10. For example, the repository system 34 can be stored in the memory 14 of the computing system 10. For another example, the repository system may be maintained by a computing device with its own discrete memory that is included in the computing system 10.

In some implementations, the computing system 10 can aggregate the risk information 30 for each of the layers 18 to obtain aggregated risk information 40. The aggregated risk information 40 can indicate an aggregated degree of risk associated with the containerized unit of software instructions 16. For example, the aggregated risk information 40 can indicate an aggregated degree of code coverage for the services 20 implemented by the layers 18 of the containerized unit of software instructions 16, an aggregated security vulnerability risk (e.g., V: MED), a determination whether the services 20 of the containerized unit of software instructions 16 are maintained (e.g., MNT: N), and an overall degree of risk (e.g., R:M (medium)).

In some implementations, the computing system 10 can annotate the containerized unit of software instructions 16 with the aggregated risk information 40. In some implementations, the computing system 10 can provide the aggregated risk information 40. For example, the computing system 10 can provide the aggregated risk information 40 to the repository system 34 with or without the containerized unit of software instructions 16.

In some implementations, the computing system 10 may make a determination that the degree of risk indicated by the aggregated risk information 40 for the containerized unit of software instructions 16 is greater than a threshold degree of risk. For example, the computing system 10 may utilize the threshold risk determinator 42 to determine that the degree of risk indicated by the aggregated risk information 40 is greater than the threshold degree of risk.

Based on the determination, the computing system 10 can obtain a second containerized unit of software instructions 46 different than the containerized unit of software instructions 16. For example, the computing system 10 can provide a replacement request 44 to the repository system 34 for a replacement container. The repository system 34 can select a second containerized unit of software instructions 46 that fulfills a similar purpose to the containerized unit of software instructions 16 based on container information 48. The container information 48 can indicate which of the containerized units of software instructions included in the container repository 36 serve sufficiently similar purposes to that of the containerized units of software instructions 16 (e.g., container_5, container_14, container_22, etc.). The repository system 34 can provide the second containerized unit of software instructions 46 to the computing system 10. The computing system 10 can replace the containerized unit of software instructions 16 with the second containerized unit of software instructions 46. In such fashion, the computing system 10 can facilitate code coverage based risk mitigation for containers.

Additionally, or alternatively, in some implementations, the computing system 10 may make a determination that the degree of risk 31 indicated by the risk information 30 for one of the layers 18 of the containerized unit of software instructions 16 is greater than a threshold degree of risk. For example, the computing system 10 may utilize the threshold risk determinator 42 to determine that the degree of risk 31 indicated by the risk information 30 for layer 18-1 is greater than the threshold degree of risk.

Based on the determination, the computing system 10 can obtain a replacement layer 50 for the layer determined to pose too great of a risk. To follow the previous example, the computing system 10 can provide replacement request 44 to the repository system 34 for a replacement layer for layer 18-1. The repository system 34 can select a replacement layer 50 that loads a service that fulfills a purpose similar to the service 20-1 loaded by layer 18-1 based on the layer information 52. The layer information 52 can indicate which of the layers included in the layer repository 38 load services that serve sufficiently similar purposes to that of the service 20-1 loaded by layer 18-1. The repository system 34 can provide the replacement layer 50 to the computing system 10. The computing system 10 can replace the layer 18-1 with the replacement layer 50. In such fashion, the computing system 10 can facilitate code coverage based risk mitigation for containers.

Figure 2:
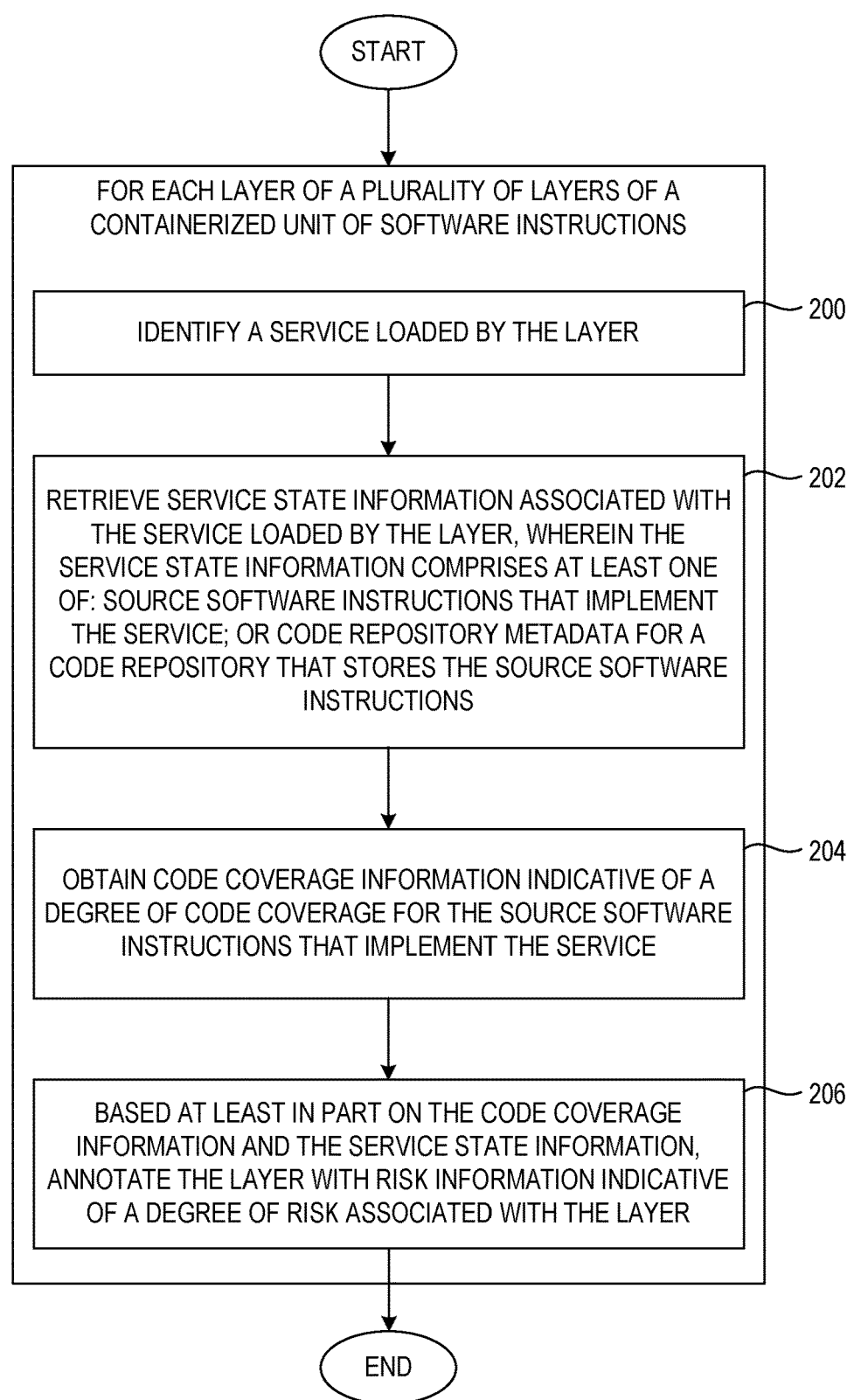
FIG. 2 is a flowchart of a method for coverage based risk mitigation for containers according to some implementations of the present disclosure.

FIG. 2 is a flowchart of a method for coverage based risk mitigation for containers according to some implementations of the present disclosure. FIG. 2 will be discussed in conjunction with FIG. 1.

For each layer of a plurality of layers 18 of a containerized unit of software instructions 16, the computing system 10 identifies a service 20 loaded by the layer 18 (FIG. 2, block 200). For each layer of the plurality of layers 18, the computing system 10 retrieves service state information 24 associated with the service 20 loaded by the layer 18, wherein the service state information 24 includes at least one of source software instructions 24-1 that implement the service 20, or code repository metadata 24-2 for a code repository 27 that stores the sources software instructions 24-1 (FIG. 2, block 202). For each layer of the plurality of layers 18, the computing system 10 obtains code coverage information 26 indicative of a degree of code coverage for the source software instructions 24-1 that implement the service 20 (FIG. 2, block 204). For each layer of the plurality of layers 18, the computing system 10, based at least in part on the code coverage information 26 and the service state information 24, annotates the layer 18 with risk information 30 indicative of a degree of risk 31 associated with the layer 18 (FIG. 2, block 206).

Figure 3:
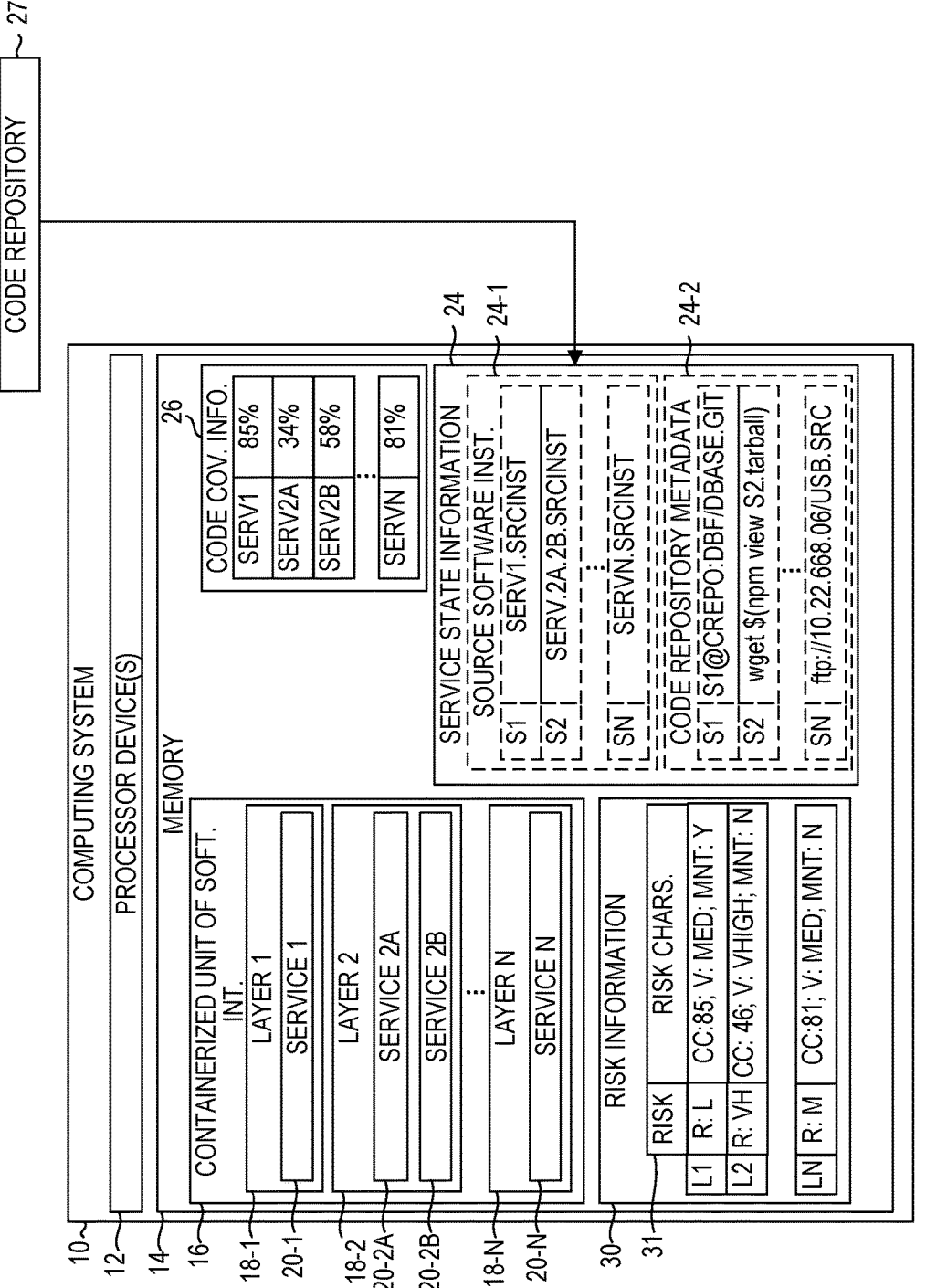
FIG. 3 is a simplified block diagram of the environment illustrated in FIG. 1 according to one implementation of the present disclosure.

FIG. 3 is a simplified block diagram of the environment illustrated in FIG. 1 according to one implementation of the present disclosure. The computing system 10 includes the memory 14 and the processor device(s) 12 coupled to the memory 14. The processor device(s) 12 are to, for each layer of a plurality of layers 18 of a containerized unit of software instructions 16, identify a service 20 loaded by the layer 18. The processor device(s) 12 are further to, for each of the layers 18, retrieve service state information 24 associated with the service 20 loaded by the layer 18, wherein the service state information 24 includes at least one of source software instructions 24-1 that implement the service 20, or code repository metadata 24-2 for a code repository 27 that stores the source software instructions 24-1. The processor device(s) 12 are further to, for each of the layers 18, obtain code coverage information 26 indicative of a degree of code coverage for the source software instructions 24-1 that implement the service 20. The processor device(s) 12 are further to, for each of the layers 18, based at least in part on the code coverage information 26 and the service state information 24, annotate the layer 18 with risk information 30 indicative of a degree of risk 31 associated with the layer 18.

Figure 4:
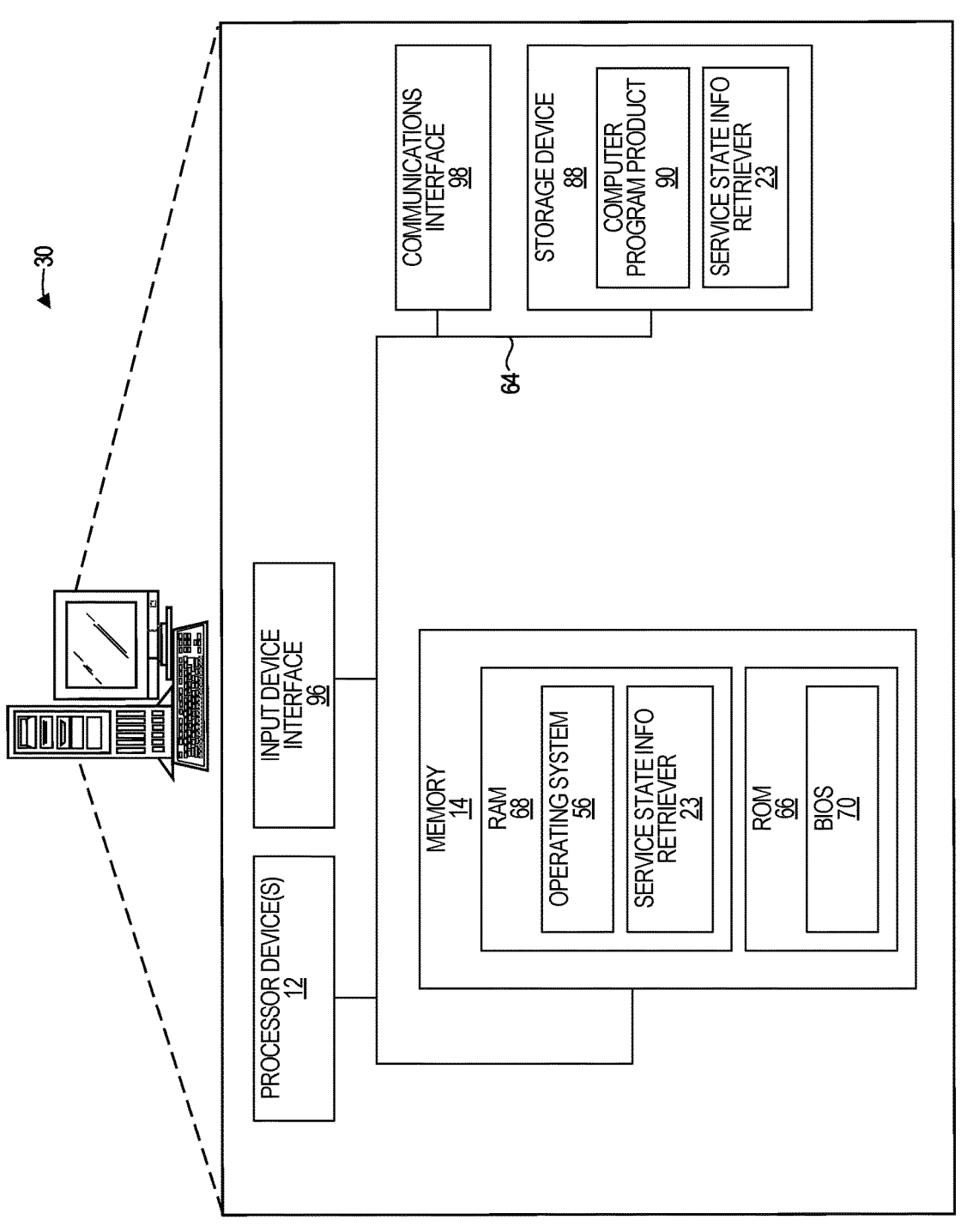
FIG. 4 is a block diagram of the computing system suitable for implementing examples according to one example.

FIG. 4 is a block diagram of the computing system 10 suitable for implementing examples according to one example. The computing system 10 may comprise any computing or electronic device(s) capable of including firmware, hardware, and/or executing software instructions to implement the functionality described herein, such as a computer server, a desktop computing device, a laptop computing device, a smartphone, a computing tablet, or the like. The computing system 10 includes the processor device(s) 12, the memory 14, and a system bus 64. The system bus 64 provides an interface for system components including, but not limited to, the memory 14 and the processor device(s) 12. The processor device(s) 12 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 14 may include non-volatile memory 66 (e.g., read-only memory (ROM), erasable programmable read-only memory (EPROM), electrically erasable programmable read-only memory (EE-PROM), etc.), and volatile memory 68 (e.g., random-access memory (RAM)). A basic input/output system (BIOS) 70 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 68, including an operating system and one or more program modules, such as the service state information retriever 23, which may implement the functionality described herein in whole or in part. All or a portion of the examples may be implemented as a computer program product 90 stored on a transitory or non-transitory computer-usable or computer-readable storage medium, such as the storage device 88, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the service state information retriever 23 in the volatile memory 68, may serve as a controller, or control system, for the computing system 10 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 96 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing system 10 may also include the communications interface 98 suitable for communicating with a network as appropriate or desired. The computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

14

What is claimed is:

1. A method comprising:
for each layer of a plurality of layers of a containerized unit of software instructions:
identifying, by a computing system comprising one or more computing devices, a service loaded by the layer;
retrieving service state information associated with the service loaded by the layer, wherein the service state information comprises:
source software instructions that implement the service; and
code repository metadata for a code repository that maintains a code versioning system for the source software instructions, wherein the code repository is remote from the computing system;
obtaining code coverage information indicative of a degree of code coverage for the source software instructions that implement the service; and
based at least in part on the code coverage information and the service state information, annotating the layer with risk information indicative of a degree of risk associated with the layer;
making a determination that the degree of risk associated with a first layer of the plurality of layers is greater than a threshold degree of risk; and
based on the determination, replacing the first layer of the plurality of layers with a different layer that loads a service of a same service type as the service loaded by the first layer.

2. The method of claim 1, further comprising generating aggregated risk information based at least in part on the risk information annotated to each of the plurality of layers, wherein the aggregated risk information is indicative of a degree of risk associated with the containerized unit of software instructions; and
annotating the containerized unit of software instructions with the aggregated risk information.

3. The method of claim 2, wherein the method further comprises:
making a determination that the degree of risk associated with the containerized unit of software instructions is greater than an aggregated threshold degree of risk; and
based on the determination, obtaining a second containerized unit of software instructions different than the containerized unit of software instructions.

4. The method of claim 1, wherein retrieving the service state information comprises retrieving service state information associated with the service loaded by the layer, wherein the service state information comprises the source software instructions that implement the service; and
wherein obtaining the code coverage information comprises performing a code coverage analysis on the source software instructions that implement the service to obtain the code coverage information indicative of the degree of code coverage for the source software instructions that implement the service.

5. The method of claim 1, wherein the code repository metadata comprises at least one of:
information descriptive of contributors to the source software instructions;
information indicative of a degree of severity assigned to issues with the source software instructions submitted by the contributors to the code repository;
information descriptive of prior modifications to the source software instructions submitted to the code repository; or a code coverage file indicative of a degree of code coverage for the source software instructions.

6. The method of claim 5, wherein retrieving the service state information comprises retrieving service state information associated with the service loaded by the layer, wherein the service state information comprises the code repository metadata for the code repository that maintains the code versioning system for the source software instructions, and wherein the code repository metadata comprises the code coverage file; and wherein obtaining the code coverage information comprises extracting the code coverage information from the code coverage file.

7. The method of claim 1, wherein the code repository metadata comprises information descriptive of prior modifications to the source software instructions submitted to the code versioning system of the code repository.

8. A computing system comprising:

one or more computing devices to:

for each layer of a plurality of layers of a containerized unit of software instructions:

identify a service loaded by the layer;

retrieve service state information associated with the service loaded by the layer, wherein the service state information comprises:

source software instructions that implement the service; and code repository metadata for a code repository that maintains a code versioning system for the source software instructions, wherein the code repository is remote from the computing system;

obtain code coverage information indicative of a degree of code coverage for the source software instructions that implement the service; and based at least in part on the code coverage information and the service state information, annotating the layer with risk information indicative of a degree of risk associated with the layer;

make a determination that the degree of risk associated with a first layer of the plurality of layers is greater than a threshold degree of risk; and based on the determination, replace the first layer of the plurality of layers with a different layer that loads a service of a same service type as the service loaded by the first layer.

9. The computing system of claim 8, wherein the one or more computing devices are further to generate aggregated risk information based at least in part on the risk information annotated to each of the plurality of layers, wherein the aggregated risk information is indicative of a degree of risk associated with the containerized unit of software instructions; and annotate the containerized unit of software instructions with the aggregated risk information.

10. The computing system of claim 9, wherein the one or more computing devices are further to:

make a determination that the degree of risk associated with the containerized unit of software instructions is greater than an aggregated threshold degree of risk; and based on the determination, obtain a second containerized unit of software instructions different than the containerized unit of software instructions.

11. The computing system of claim 8, wherein retrieving the service state information comprises retrieving service state information associated with the service loaded by the layer, wherein the service state information comprises the source software instructions that implement the service; and wherein obtaining the code coverage information comprises performing a code coverage analysis on the source software instructions that implement the service to obtain the code coverage information indicative of the degree of code coverage for the source software instructions that implement the service.

12. The computing system of claim 8, wherein the code repository metadata comprises at least one of:

information descriptive of contributors to the source software instructions;

information indicative of a degree of severity assigned to issues with the source software instructions submitted by the contributors to the code repository;

information descriptive of prior modifications to the source software instructions submitted to the code repository; or a code coverage file indicative of a degree of code coverage for the source software instructions.

13. The computing system of claim 12, wherein retrieving the service state information comprises retrieving service state information associated with the service loaded by the layer, wherein the service state information comprises the code repository metadata for the code repository that maintains the code versioning system for the source software instructions, and wherein the code repository metadata comprises the code coverage file; and wherein obtaining the code coverage information comprises extracting the code coverage information from the code coverage file.

14. A non-transitory computer-readable storage medium that includes executable instructions to cause one or more processor devices of a computing system to:

for each layer of a plurality of layers of a containerized unit of software instructions:

identify a service loaded by the layer;

retrieve service state information associated with the service loaded by the layer, wherein the service state information comprises:

source software instructions that implement the service; and code repository metadata for a code repository that maintains a code versioning system for the source software instructions, wherein the code repository is remote from the computing system; and obtain code coverage information indicative of a degree of code coverage for the source software instructions that implement the service; and based at least in part on the code coverage information, determine risk information indicative of a degree of risk associated with the layer;

make a determination that the degree of risk associated with a first layer of the plurality of layers is greater than a threshold degree of risk; and based on the determination, replace the first layer of the plurality of layers with a different layer that loads a service of a same service type as the service loaded by the first layer.

15. The non-transitory computer-readable storage medium of claim 14, wherein the executable instructions are further to cause one or more processor devices to:

generate aggregated risk information based at least in part on the risk information annotated to each of the plurality of layers, wherein the aggregated risk information is indicative of a degree of risk associated with the containerized unit of software instructions.

16. The non-transitory computer-readable storage medium of claim 15, wherein the executable instructions are further to cause one or more processor devices to:

make a determination that the degree of risk associated with the containerized unit of software instructions is greater than an aggregated threshold degree of risk; and based on the determination, obtain a second containerized unit of software instructions different than the containerized unit of software instructions.

17. The non-transitory computer-readable storage medium of claim 14, wherein retrieving the service state information comprises retrieving service state information associated with the service loaded by the layer, wherein the service state information comprises the source software instructions that implement the service; and wherein obtaining the code coverage information comprises performing a code coverage analysis on the source software instructions that implement the service to obtain the code coverage information indicative of the degree of code coverage for the source software instructions that implement the service.

18. The non-transitory computer-readable storage medium of claim 15, wherein the code repository metadata comprises at least one of:

information descriptive of contributors to the source software instructions;

information indicative of a degree of severity assigned to issues with the source software instructions submitted by the contributors to the code repository;

information descriptive of prior modifications to the source software instructions submitted to the code repository; or a code coverage file indicative of a degree of code coverage for the source software instructions.

19. The non-transitory computer-readable storage medium of claim 18, wherein retrieving the service state information comprises retrieving service state information associated with the service loaded by the layer, wherein the service state information comprises the code repository metadata for the code repository that maintains the code versioning system for the source software instructions, and wherein the code repository metadata comprises the code coverage file; and wherein obtaining the code coverage information comprises extracting the code coverage information from the code coverage file.

\* \* \* \* \*